United States Patent

Abend

Patent Number: 5,792,816
Date of Patent: Aug. 11, 1998

[54] CROSSLINKING AGENTS FOR POLYMERS CONTAINING ACID ANHYDRIDE GROUPS

[76] Inventor: Thomas Abend, Sandrainstrasse 8, 9010 St. Gallen, Switzerland

[21] Appl. No.: 652,543
[22] PCT Filed: Oct. 2, 1995
[86] PCT No.: PCT/CH95/00221
§ 371 Date: Sep. 9, 1996
§ 102(e) Date: Sep. 9, 1996
[87] PCT Pub. No.: WO96/11229
PCT Pub. Date: Apr. 18, 1996

[30] Foreign Application Priority Data

Oct. 10, 1994 [CH] Switzerland ............ 3036/94
Aug. 23, 1995 [CH] Switzerland ............ 2398/95

[51] Int. Cl.$^6$ ................................ C08F 20/08
[52] U.S. Cl. ...................... 525/327.4; 525/327.6
[58] Field of Search ................ 525/327.4, 327.6

[56] References Cited

U.S. PATENT DOCUMENTS

| | | | |
|---|---|---|---|
| 3,036,980 | 5/1962 | Dunham, Jr. et al. | 260/31.4 |
| 3,533,987 | 10/1970 | Ciamdra et al. | 260/37 |
| 3,725,360 | 4/1973 | Adams | 260/78.52 |

FOREIGN PATENT DOCUMENTS

| | | |
|---|---|---|
| 361186 | 3/1973 | U.S.S.R. |
| 96/11229 | 4/1996 | WIPO |

*Primary Examiner*—Edward J. Cain
*Attorney, Agent, or Firm*—Shoemaker and Mattare, Ltd

[57] ABSTRACT

Subjects of the invention are new crosslinking agents for polymers with acid anhydride groups on the basis of amines or polyamines that are adsorbed on anhydrous molecular sieve powder.

In blends with the polymers containing acid anhydride groups and under water-free conditions, the new crosslinkers form crosslinkable polymer systems that are storage-stable at room temperature. The crosslinking reaction is triggered by water or elevated temperature, leading to desorption of the amines by the molecular sieve powder and reaction with the anhydride groups.

The crosslinking products are very soft to hard compositions with different tensile strength, tear resistance, permanent set, glass transition temperature, heat resistance, adhesion, tackiness and chemical resistance. The polymer systems can be used in the manufacture of molding compositions, coating compositions, foams, adhesive compositions, hot melt compositions and sealant compositions.

23 Claims, No Drawings

CROSSLINKING AGENTS FOR POLYMERS CONTAINING ACID ANHYDRIDE GROUPS

The invention concerns a crosslinking agent on the basis of amines for polymers containing acid anhydride groups.

Crosslinkable polymers with acid anhydride groups are valuable reactive raw materials which can replace isocyanate prepolymers, polysulfides, epoxy or acrylic resins in many applications for liquid or solid plastics, for example in adhesives, sealants and coatings. Amines have been particularly proven as crosslinking agents. They are excellent when used for the manufacture of hydrolytically stable and thermally resistant crosslinking products.

Aliphatic and aromatic amines have the disadvantage that they react very rapidly with the polymers containing acid anhydride groups. At room temperature or at elevated temperatures, the blends of components show a pot life of a few seconds to a few minutes. Pot lives in the range of 5 to 300 minutes are obtained if sterically hindered aromatic amines are used as crosslinking agents. Such systems, as described in WO 94/04624, have the disadvantage that the sterically hindered amines are expensive and mostly available as solids, so that they can only be used as solutions in plasticizers or solvents.

Alternatively, amines can be converted into a less reactive form with known blocking agents, for example into the form of a ketimine, aldimine or oxazolane. By the action of water, the amines are deblocked and can react with the acid anhydride groups. The blocking agents that are also released have the disadvantage, however, that they impart a long-term unpleasant odor to the crosslinked product, and also increase the volatile portion of the blends.

Objects of the invention are crosslinking agents on the basis of amines with the characterizing features of claim 1, a method of manufacture of storage-stable polymer systems with polymers containing acid anhydride groups according to claim 17, and the polymer systems themselves, according to claim 22. The sub-claims describe advantageous embodiments of the invention.

The object of the invention is particularly fulfilled by the molecular sieve powders loaded with amines as a crosslinking agent which are suited to the controlled reaction with crosslinkable polymers in a particularly advantageous way, since the release of the adsorbed amines is attained specifically by means of moisture, or by desorption temperatures of above 80° C.

Molecular sieves are synthetically manufactured crystalline metal aluminosilicates that belong to the class of minerals known as zeolites. The dehydrated crystals form a network of hollow spaces interconnected by defined capillaries that leads to a large internal surface. They are capable of adsorbing polar chemicals on their crystal structure, respectively their internal surface.

The zeolites used according to the invention are alkali metal aluminosilicates or alkaline earth metal aluminosilicates, and possess a very large number of pores with uniform dimensions. Molecules that are sufficiently small can penetrate into the pores of the anhydrous molecular sieve, and become adsorbed. The pores have regular diameters that, depending on the composition of the zeolite and the temperature, can be between 0.3 and 1.5 nm. For the crosslinking agent according to the invention, commercially available molecular sieve powders are preferred, mainly those with a pore diameter of 0.38 nm (standard commercial designation: type 4A), 0.44 nm (type 5A) and 0.8 nm or 0.84 nm (types 10× or 13×) and marketed by various manufacturers. Free-flowing powder with particle sizes of less than 50 μm, and particularly less than 20 μm, are preferred.

Depending on type, and in a state of equilibrium, the adsorption capacity of the molecular sieve powder for water at room temperature amounts from 20 to 34 percent by weight. The anhydrous molecular sieve powders can be loaded with 3 to 30, preferably with 5 to 25 percent by weight amine.

The loading of molecular sieve powders with polar chemicals is know in the art, and the most common methods are, for example, described by S. Borgmann et. al. in *Plaste und Kautschuk*, 30 (1) 20 (1983). Depending on the chemical and physical properties of the amines, these are deposited via the gas phase, for example in a current of a carrier gas, via sublimation of the amine and adsorption into the molecular sieve, or via solutions in plasticizers, liquid diluents or solvents. The solvents can be removed after adsorption of the amine by distillation, if necessary under reduced pressure.

The loaded molecular sieves can also be used in a blend with other unloaded molecular sieves serving as desiccants or stabilizing agents. Additional molecular sieves for the adsorption of water can also have other pore diameters. The use of different amines on one or different molecular sieve powders is also advantageous.

Amines for the crosslinking of polymers containing acid anhydride groups are aliphatic, alicyclic, heterocyclic or aromatic, primary or secondary amines with effective molecular diameters less than 1.5 nm. Di- or polyamines are suitable for crosslinking.

Examples of suitable amines according to the invention are:

Ethylenediamine, propanediamine, butanediamine, pentanediamine, hexanediamine, isomers of the named amines, 1,2- and 1,4-diaminocyclohexane, diethylenetriamine, triethylene-tetramine, tetraethylenepentamine, N-aminoethyl-3-aminopropyltrialkoxysilane, triamino-functional propyltrialkoxysilane, piperazine, aminoethylpiperazine, di-aminoethyl-piperazine, xylylenediamine, isophoronediamine, 3,3'-dimethyl-4, 4'-diaminodicyclohexylmethane, 4,4'-diaminocylohexylmethane, 4,4'-diaminodiphenylmethane, 1,4-diaminobenzanilide.

In a particular embodiment of the crosslinking agent according to the invention, up to 50 equivalent percent of the reactive groups of the crosslinking agent can be replaced by hydroxy groups, for example by hydroxy groups of aminoalcohols or polyols. Instead of molecular sieves loaded with amines, the molecular sieves loaded with aminoalcohols or polyols can be used for crosslinking the polymers containing anhydrides.

Examples of aminoalcohols are ethanolamine, diethanolamine, propanolamine, dipropanolamine, N-hydroxyethyl-aniline.

Examples of polyols are ethyleneglycol, propyleneglycol, di- or triethyleneglycol, dipropyleneglycol, butanediol, neopentylglycol, cyclohexane-di-methanol, hydrochinone-bis-hydroxyethyl-ether, triethanolamine, methyldiethanolamine, tripropanolamine, N,N-di (2-hydroxyethyl)-aniline.

The molecular sieve powders loaded at least partially with an amine can additionally be loaded with a catalyst for the reaction of the acid anhydride with the hydroxy bonds. Suitable catalysts, which are preferably used in amounts of maximum 2 percent weight related to the total weight of the formulation, are preferably tertiary aliphatic amines with 1 to 14 C-atoms in the alkyl substituents, diazabicyclooctane, diazabicycloundecene, dimethylbenzylamine, methylmorpholine, dimethylpiperazine, N-alkyl substituted imidazole and their blends.

The crosslinking agents according to the invention are preferably used for the production of reactive, crosslinkable, polymer systems on the basis of polymers containing acid anhydride groups. Under anhydrous conditions, blends of molecular sieves loaded with amines and polymers containing acid anhydride groups are stable. Even in the presence of additives they are storage stable in an uncrosslinked condition at room temperature or slightly raised temperatures.

Such blends must, until processing, be stored at temperatures below 70° C., and preferably below 55° C., in containers that are impervious to moisture. If this storage temperature is exceeded, the normal shelf life of the composition of several months will be reduced.

Loaded with ethylenediamine, molecular sieve powders of type 4A, having a desorption temperature of 175° C., are particularly stable when mixed with polymers containing acid anhydride groups. Because of the low equivalent weight of the ethylenediamine and the low cost of the molecular sieve powder of type 4A, the use of this combination is also economically advantageous.

Release of the amines adsorbed in the molecular sieve by means of water at or after application is the result of various mechanisms:

by intrusion of humidity, by diffusion from an aqueous substrate or from an aqueous active base, by the addition of water or of mixtures of water with solvents or plasticizers, by water pastes, by water saturated solids or by salts with crystal water. Release can ensue immediately or after a delay, depending on the nature of the triggering mechanism.

Alternatively, the adsorbed amines can be released by warming of the compositions to temperatures above the desorption temperature. At temperatures above the so-called desorption temperature, the adsorption equilibrium will be on the side of the free amine.

For example, on the basis of experiments, the following temperatures have been established, the measured desorption temperature depending on the heating rate of the system:

| Molecular sieve type | Amine | Desorption temperature |
|---|---|---|
| 4A | Ethylenediamine | 175 +/− 5 |
| 4A | Ethanolamine | 175 +/− 5 |
| 13X | Ethylenediamine | 130 +/− 5 |
| 13X | Ethanolamine | 125 +/− 5 |
| 13X | Diethylenetriamine | 125 +/− 5 |
| 13X | Piperazine | 120 +/− 5 |

By heating the system, and also by means of the release of crystal water or water adsorbed on fillers or molecular sieves, the equilibrium can be shifted in the direction of the free amine, and the crosslinking thus initiated or accelerated. Heating of the system to crosslinking temperature can ensue by means of radiated heat, convection heat, by means of resistance, induction or microwave heating, by frictional heat or with ultrasonic vibrations.

The reaction or crosslinking temperature, which must be equal to or above the desorption temperature, lies in the range of 80° to 190° C., preferably within the range of 100° to 180° C. The crosslinking temperature can be influenced by the type of molecular sieve, by the amine, by the concentration of the amine adsorbed on the molecular sieve, as well as by means of suitable measures controlling the water content of the system. To this end, also water adsorbing substances such as unloaded, calcined molecular sieve powder are suitable.

At room temperature, polymers or oligomers, forming the reactive base of these compositions, are solid or liquid polymers containing acid anhydride groups with molecular weights Mn of 500 to 1 000 000 Dalton. Polymers with a molecular weight Mn of 1000 to 500 000 Dalton are preferred. The polymers or oligomers containing acid anhydride groups have an acid number corresponding to the acid anhydride groups (determined with water-free alcoholic potassium hydroxide solution according to DIN 53 402) of 0.4 to 445 mg KOH/g. For example, this corresponds to a content of approximately 0.07 to 77 percent of weight of maleic acid anhydride, based on the weight of the functional polymer.

The acid anhydride groups can be distributed over the polymer molecule statistically or regularly or in the terminal position. The introduction of the acid anhydride groups can be achieved by means of copolymerisation, by reaction with terminally located reactive groups, by subsequent addition of unsaturated acid anhydrides onto individual or conjugated double bonds, or by means of graft reactions. The corresponding methods of synthesis are state of the art and disclosed in patent documents and the professional literature. A comprehensive overview of polymers containing acid anhydrides, their methods of sythesis and properties, and especially those which are synthesized using maleic acid anhydride, is contained in B. C. Trivedi and B. M. Culbertson: *Maleic Anhydride*, Plenum Publ., New York (1982).

The polymers used according to the invention are preferably individual, or selected as a blend, from the group copolymers of unsaturated cyclic acid anhydrides, especially maleic or itaconic acid anhydride, with olefinic unsaturated anhydrides, for example copolymers of acrylic acid and methacrylic acid esters with maleic and itaconic acid anhydride, addition products of unsaturated cyclic anhydrides on polymers with individual or conjugated double bonds, for example addition products of maleic acid anhydride on double bonds of polybutadienes, addition products of unsaturated cyclic acid anhydrides to styrene-butadiene rubber, thermoplastic styrene-butadiene- and styrene-isoprene-block copolymers or to unsaturated decomposition products of high molecular weight natural rubbers, addition products of maleic acid anhydride on partially hydrated block copolymers of styrene-butadiene (e.g. SEBS), addition products of unsaturated cyclic acid anhydrides with polymers with mercaptan groups, for example with an isocyanate prepolymer based urethane of mercaptoethanol, addition products which have been obtained by graft reactions of olefinic unsaturated cyclic acid anhydrides to polymers, for example graft products of maleic acid anhydride to a copolymer of ethylene with vinyl acetate or to a copolymer of ethylene, propylene and butene, polymeric ester-anhydrides or amine-anhydrides obtained through condensation of hydroxy- or aminofunctional polymers with trimellitic acid anhydride, pyromellitic acid anhydride, benzene-tetracarboxylic acid anhydride, benzophenone-tetracarboxylic acid anhydride or ethylene-bis-trimellitic acid anhydride.

The acid anhydride groups can be contained only in one of the polymer components. In many cases blends of polymers with different content of anhydride groups or different range of molecular weights are advantageously used. For example, it can be of advantage to compound a high molecular weight polymer with a low content of acid anhydride groups with a short-chain polymer with a high content of acid anhydride groups.

The stochiometric relationship of the acid anhydride groups of the polymer to primary or secondary amino groups of the crosslinking agent lies in the range between 0.5 and 5, preferably between 0.6 and 3.

The properties of the uncrosslinked and crosslinked compositions can be specifically controlled by those skilled in the art and depend, amongst other factors, on the polymer content, on the anhydride content of the polymer, on the degree of polymerization, on the proportion of comonomers, on the functionality, on the ratio of acid anhydride groups to the functional groups of the crosslinking agent, and the type of functional groups, and additives. Different additives are of great influence on different properties of the compositions in the uncured or crosslinked condition, for example:

> inorganic or organic fillers, pigments, powdered metal, dyestuffs, carbon black, pyrogenic silica, short-chopped fibers, powdered rubber, plasticizers, extender oils, bitumen, non-reactive polymers, reactive modifying agents, resins, tackifying resins, adhesive additives, organofunctional silanes, surfactants, silicone oils, flame retarding additives, antioxidants and light stabilizers, anti-corrosion agents, scents, fungistatic and bacteriostatic agents, thixotropic agents, blowing agents and foam stabilizers and solvents. The use and effect of these additives and their preferred concentrations are state of the art and known to the expert in the art.

The invention also concerns a method for producing a crosslinkable polymer system by means of homogenous mixing of the crosslinking agent according to the invention with polymers containing acid anhydride groups, and selectively with additives. Finally, the invention also concerns single component polymer systems for adhering, coating, sealing, foaming, extruding, molding and injection molding which can be produced with the crosslinking agents and polymers with acid anhydride groups according to the invention, and which at ambient conditions can be worked as liquids or paste-like compositions, or as meltable compositions at elevated temperatures.

For example, the compositions according to the invention are suitable for producing reactive hot melt adhesives and pressure sensitive hot melt adhesives which are stored under water-free conditions, and later are applied thermoplastically at elevated temperatures. After cooling, they will solidify and crosslink under the influence of moisture to a composition with improved mechanical strength, heat resistance and resistance to solvents.

In the crosslinked state, the polymer systems vary from very soft to hard compositions with differing tensile strength, tear resistance, permanent set, glass transition temperature, heat resistance, adherence, tackiness and chemical resistance.

EXAMPLES

Example 1

Manufacture of a molecular sieve powder loaded with piperazine

Mixing components used:

| (1) Purmol 13X | Calcined 13X-molecular sieve powder CU Chemie Uetikon AG, CH-Uetikon |
|---|---|
| (2) Piperazine | Anhydrous, in flakes, Fluka AG, CH-Buchs |

130 g calcined 13X-molecular sieve powder were mixed with 20 g water-free powdered piperazine. The mixture self-heated through adsorption heat to 55° C. and was subsequently stored for 24 hours in the desiccator at 80° C. An odor-free powder resulted, with an equivalent weight of 322 g. Under water-free conditions, this loaded molecular sieve has an unlimited shelf life.

Example 2

Manufacture of a molecular sieve powder loaded with 8% ethylenediamine.

Mixing components used:

| (1) Purmol 4A ST | Calcined 4A-molecular sieve powder, surface stabilized CU Chemie Uetikon AG, CH-Uetikon |
|---|---|
| (2) Ethylenediamine | Purum, Fluka A6, CH-Buchs |

16 g ethylenediamine was dissolved in 150 ml toluene and 184 g Purmol 4A anhydrous molecular sieve powder was introduced and mixed. The mixture was stored with occasional agitation for 3 days at room temperature, and subsequently the solvent was distilled off at 60 ° C. under water-jet vacuum. An odor-free powder resulted with an ethylenediamine content of 8 percent of weight and an equivalent weight of 375 g.

Example 3

Production of a molecular sieve loaded with 13% ethylenediamine

In a desiccator, 200 g anhydrous 4A molecular sieve powder was spread in a petri dish with a layer thickness of 1 cm, in a second petri dish 30 g of ethylenediamine (1 equivalent) was placed in the same desiccator, and subsequently the air space of the desiccator was briefly evacuated with a water-jet vacuum pump. After three days, the volatile ethylenediamine had been adsorbed by the molecular sieve via the gas phase. By heating the irregularly loaded molecular sieve to 100° C. in a closed flask for 24 hours, an even distribution of the amine was induced on the powder. The amine loaded molecular sieve powder has an equivalent weight of 230 g.

Example 4

Manufacture of a polymer system that can be used as a sealing composition.

Mixing components used:

| (1) Lithene LX16-5MA | Liquid polybutadiene with 4.76% maleic acid anhydride |
|---|---|
| (2) Lithene LX16-10MA | Liquid polybutadiene with 9.1% maleic acid anhydride Revertex Ltd., GB-Harlow |
| (3) DINP | Diisononylphthalate, BASF AG, D-Ludwigshafen |
| (4) Nyflex 810 | Naphthenic oil, AB Nyas Petroleum, S-Nyeshamn |
| (5) Socal U1S1 | Precipitated, surface treated calcium carbonate Solvay AG, B-Brussels |
| (6) Omya BLR3 | Ground calcium carbonate, surface treated |

-continued

| | |
|---|---|
| (7) Purmol 3A ST | Plüss-Stauffer AG, CH-Oftringen<br>Calcined 3A-molecular sieve powder, stabilized<br>CU Chemie Uetikon AG, CH-Uetikon |
| (8) Vulkanox BKF | Antioxidant, Rhein-Chemie AG, D-Mannheim |
| (9) Aerosil R 972 | Pyrogenic silica, Degussa AG, D-Hanau |

The following components were mixed in the vacuum planetary mixer

| | | g | equivalent |
|---|---|---|---|
| (1) | Lithene LX16-5MA (eq. = 2050 g) | 500 | 0.244 |
| (2) | Lithene LX16-10MA (eq. = 1040 g) | 500 | 0.48 |
| (3) | DINP | 455 | |
| (4) | Nyflex 810 | 205 | |
| (5) | Socal U1S1 | 900 | |
| (6) | Omya BLR3 | 680 | |
| (7) | Purmol 3ST | 60 | |
| (8) | Vulkanox BKF | 5 | |
| (9) | Aerosil R 972 | 10 | |
| (10) | Loaded molecular sieve powder<br>according to example 1, eq. = 322 g | 185 | 0.575 |
| (11) | Total | 3500 | |

Stochiometric relationship: 1.26 anhydride equivalents/1 amine equivalent Density: 1.35 g/ccm
Application of the sealant composition The composition was applied to the seam of two parts of untreated sheet iron in beads at a thickness of 3 mm, and crosslinking was induced.
a) Hot curing By heating to a temperature of 115° C. for 10 minutes, the mixture solidified. By subsequent reaction under normal conditions for 14 days, an elastic sealing bead was obtained, having the following properties:

Shore A: 51

Tensile strength according to DIN 53504: 1.59 N/mm2

Tear strength according to DIN 53504: 60%
b) Crosslinking by moisture

After extrusion, the composition was exposed to ambient air in normal conditions. Within 8 minutes, a skin had been formed. Curing proceeded from outside to inside. After 14 days in normal conditions, the following properties were measured:

Shore A: 47 Tensile strength according to DIN 53504: 1.51 N/mm2

Tear strength according to DIN 53504: 64%

The cured composition permitted painting with a primer and automobile paint without problems and with good adhesion.

Example 5
Manufacture of a polymer system that can be used as a pressure sensitive hot melt adhesive
Mixing components used:

(1) Ethylene-vinylacetate-copolymer, 33% VA, with approx. 1% maleic anhydride, melting index 20 g (190° C., ASTM D 1238), anhydride equivalent approx. 9800 g (2) Hydrogenated hydrocarbon resin, softening point 89° C., Exxon Chem., B-Brussels (3) LX16-5MA, anhydride equivalent 2050 g (4) Molecular sieve powder loaded with 8% ethylenediamine, equivalent weight approx. 375 g, according to example 2.

The following components were mixed in a blender at 190° C. in a nitrogen atmosphere:

| | g | equivalent |
|---|---|---|
| (1) Maleinized EVA (eq. = 9800 g) | 300 | 0.0306 |
| (2) Hydrogenated resin | 550 | |
| Then the following components were added at 135° C. | | |
| (3) Lithene LX16-5MA (eq. = 2050 g) | 150 | 0.073 |
| (4) Molecular sieve powder according to example 2 (eq. = 375 g) | 60 | 0.160 |
| Total | 1060 | |

Stochiometric ratio=0.65 anhydride equivalents/1 amino equivalent

The non-crosslinked pressure sensitive hot melt adhesive was kept in an aluminum cartridge.

The following properties according to DIN 53504 were measured on films:

| | Fresh, prior to moisture crosslinking | after 14 days under normal conditions |
|---|---|---|
| Tensile strength N/mm² | 0.6 | 1.5 |
| Elongation at break % | 600 | 1000 |

The heat resistance (SAFT Shear Adhesion Failure Temperature) was measured on a test surface of 25×25 mm2 and 0.5 kg loading according to PSTC standards (Pressure Sensitive Tape Council)

| | Fresh, prior to moisture crosslinking | after 14 days under normal conditions |
|---|---|---|
| SAFT °C. | 60 | 90 |

In spite of crosslinking, the pressure sensitive hot melt adhesive retained its surface tackiness.

Example 6
Manufacture of a crosslinkable hot melt adhesive
Mixing components used:

(1) Copolymer of ethylacrylate and 8% maleic acid anhydride, Mn 6000, equivalent weight 1225 g, viscosity at 80° C. 350 000 mPa.s Acronal DS 3436×, BASF D-Ludwigshafen (2) 4A-molecular sieve powder loaded with 13% ethylenediamine according to example 3, equivalent weight approx. 230 g The following components were mixed at 95° C. under a nitrogen atmosphere in a vacuum planetary mixer:

| | g | Equivalent |
|---|---|---|
| (1) Acronal DS 3436 X (Eq. 1225 g) | 1000 | 0.816 |
| (2) Molecular sieve powder according to example 3 (Eq. 230 g) | 180 | 0.78 |
| | 1180 | |

Anhydride equivalent per amino equivalent=1.05

The heat resistance (SAFT Shear Adhesion Failure Temperature) was measured on a test surface of 25×25 mm2 and 0.5 kg loading according to PSTC standards (Pressure Sensitive Tape Council)

|         | Fresh, prior to moisture crosslinking | after 3 days under normal conditions |
| ------- | ------------------------------------- | ------------------------------------ |
| SAFT °C. | <50° C. Tacky surface                 | >170° C. Solid surface               |

Due to the higher crosslinking density, in comparison to the crosslinked polymer of example 5, the crosslinked polymer system loses its surface tackiness.

What is claimed is:

1. A composition capable of crosslinking and consisting essentially of as the components capable of crosslinking a polymer containing acid anhydride groups and a substantially anhydrous molecular sieve powder of alkaline or alkaline earth aluminosilicate being partially loaded with at least one amine, wherein the polymer contains acid anhydride groups capable of reacting with said amine.

2. Composition according to claim 1, wherein the molecular sieve powder has a pore diameter between 0.36 nm and 1.5 nm.

3. Composition according to claim 1 wherein the molecular sieve powder has particle sizes below 50 μm, preferably below 20 μm.

4. Composition according to claim 1, wherein the molecular sieve powder is a mixture of loaded and unloaded molecular sieve powders.

5. Composition according to claim 4, wherein the molecular sieve powder is loaded with 3 to 30 parts weight of amine per 100 parts anhydrous molecular sieve powder.

6. Composition according to claim 5, wherein one or more molecular sieve powders are loaded with different amines.

7. Composition according to claim 5 or 6, wherein at least one amine is a primary or secondary amine.

8. Composition according to claim 7, wherein the amine is a diamine or a polyamine.

9. Composition according to claim 1, wherein the amine is selected from the group aliphatic, alicyclic, heterocyclic and aromatic amines, the effective molecular diameter of which is less than 1.5 nm.

10. Composition according to claim 8, wherein the amine is selected from the group
ethylenediamine, propanediamine, butanediamine, pentanediamine, hexanediamine, isomers of the named amines, 1,2- and 1,4-diaminocyclohexane, diethylenetriamine, triethylene-tetramine, tetraethylenepentamine, N-aminoethyl-3-aminopropyltrialkoxysilane, triaminofunctional propyltrialkoxysilane, piperazine, aminoethylpiperazine, di-aminoethyl-piperazine, xylylenediamine, isophoronediamine, 3,3'-dimethyl-4, 4'-diaminodicyclohexylmethane, 4,4'-diaminocylohexyl-methane, 4,4'-diaminodiphenylmethane, 1,4-diaminobenzanilide.

11. Composition according to claim 9 or 10, wherein the molecular sieve powder is loaded with 5 to 25 parts weight of amine per 100 parts of anhydrous molecular sieve powder.

12. Composition according to claim 11, wherein up to 50 equivalent percent of the reactive groups of amines adsorbed in the molecular sieve powder are replaced by hydroxyl groups of aminoalcohols or polyols.

13. Composition according to claim 12, wherein the aminoalcohols are selected from the group ethanolamine, diethanolamine, propanolamine, dipropanolamine, N-hydroxy-ethylaniline.

14. Composition according to claim 12, wherein the polyols are selected from the group ethyleneglycol, propyleneglycol, di- or triethyleneglycol, dipropyleneglycol, butanediol, neopentylglycol, cyclohexane-di-methanol, hydrochinone-bis-hydroxyethylether, triethanolamine, N-methyl-diethanolamine, tripropanolamine, N,N-di (2-hydroxyethyl)-aniline.

15. Composition according to claim 1, wherein a maximum of 2 percent of weight of catalyst is adsorbed in the molecular sieve powder, which is partially loaded with amine.

16. Composition according to claim 15, wherein the catalyst is a tertiary amine selected from the group tertiary aliphatic amines with 1 to 14 C-atoms in the alkyl substituents, diazabicyclooctane, diazabicycloundecene, dimethylbenzylamine, methylmorpholine, dimethylpiperazine, N-alkyl substituted imidazole.

17. Composition according to claim 1, wherein the stochiometric ratio of the acid anhydride groups of the polymer to amino groups of the crosslinking agents lies in the range between 0.5 and 5.

18. A composition according to claim 1, comprising additional additives, selected from the group inorganic or organic fillers, pigments, powdered metal, dye-stuffs, carbon black, pyrogenic silica, short-chopped fibers, powdered rubber, plasticizers, extender oils, bitumen, non-reactive polymers, reactive modifying agents, resins, tackifying resins, adhesive additives, organofunctional silanes, surfactants, silicone oils, flame retarding additives, antioxidants and light stabilizers, anti-corrosion agents, scents, fungistic and bacteriostatic agents, thixotropic agents, blowing agents, foam stabilizers and solvents.

19. Composition according to claim 1, characterized in that at least one polymer is selected from the group copolymers of maleic or itaconic acid anhydride with olefinic unsaturated monomers, addition products of unsaturated cyclic acid anhydrides to polymers with individual or conjugated boule bonds, addition products of unsaturated acid anhydrides to styrene-butadiene-rubber or thermoplastic styrene-butadiene and styrene-isoprene-rubbers or to unsaturated decomposition products of high molecular weight natural rubbers, addition products of unsaturated cyclic acid anhydrides to polymers with mercaptan groups, addition products obtained by means of graft reactions of olefinic unsaturated acid anhydrides to polymers, polymeric esteranhydrides or amine-anhydrides, obtained by condensation of hydroxy- or amino-functional polymers with trimellitic acid anhydride, promellitic acid anhydride, benzenetetracarboxylic acid anhydride, benzophenonetetracarboxylic acid anhydride to ethylene-bis-trimellitic acid anhydride, the polymers containing acid anhydrides having a molecular weight Mn of 500 to 1 000 000 Dalton, preferably a molecular weight Mn of 100 to 500 000 Dalton, and an acid number corresponding to the acid anhydride groups of 0.4 to 445 mg KOH/g (according to DIN 53 402, determined with water-free alcoholic potassium hydroxide solution).

20. Composition according to claim 1, characterized in that a blend of polymers with different anhydride groups content and/or different molecular weight ranges is used.

21. Crosslinked polymer system for adhering, coating, sealing, foaming, extruding, molding cured under the influence of moisture or heating to temperatures above the desorption temperature of the crosslinking agent used, and manufactured from polymers containing acid anhydride groups and the crosslinking agents of claim 1.

22. A method of manufacturing a storage stable polymer composition comprising the steps of (a) providing a polymer containing acid anhydride groups, (b) loading substantially anhydrous molecular sieve powders at least partially with amines cross-linkable with said polymers, (c) homogeneously mixing said molecular sieves with said polymer containing acid anhydride groups and (d) subsequently storing the final uncrosslinked composition under substantially water-free conditions.

23. A method of curing a composition capable of crosslinking and consisting essentially of as the components capable of crosslinking a polymer containing acid anhydride groups and a molecular sieve powder of alkaline or alkaline earth alumino silicate being partially loaded with at least one amine, wherein the polymer contains acid anhydride groups capable of reacting with said amine by adding water to the composition during or after application.

* * * * *